W. H. DONALD.
CLASSIFIER.
APPLICATION FILED APR. 14, 1919.
1,330,242.
Patented Feb. 10, 1920.
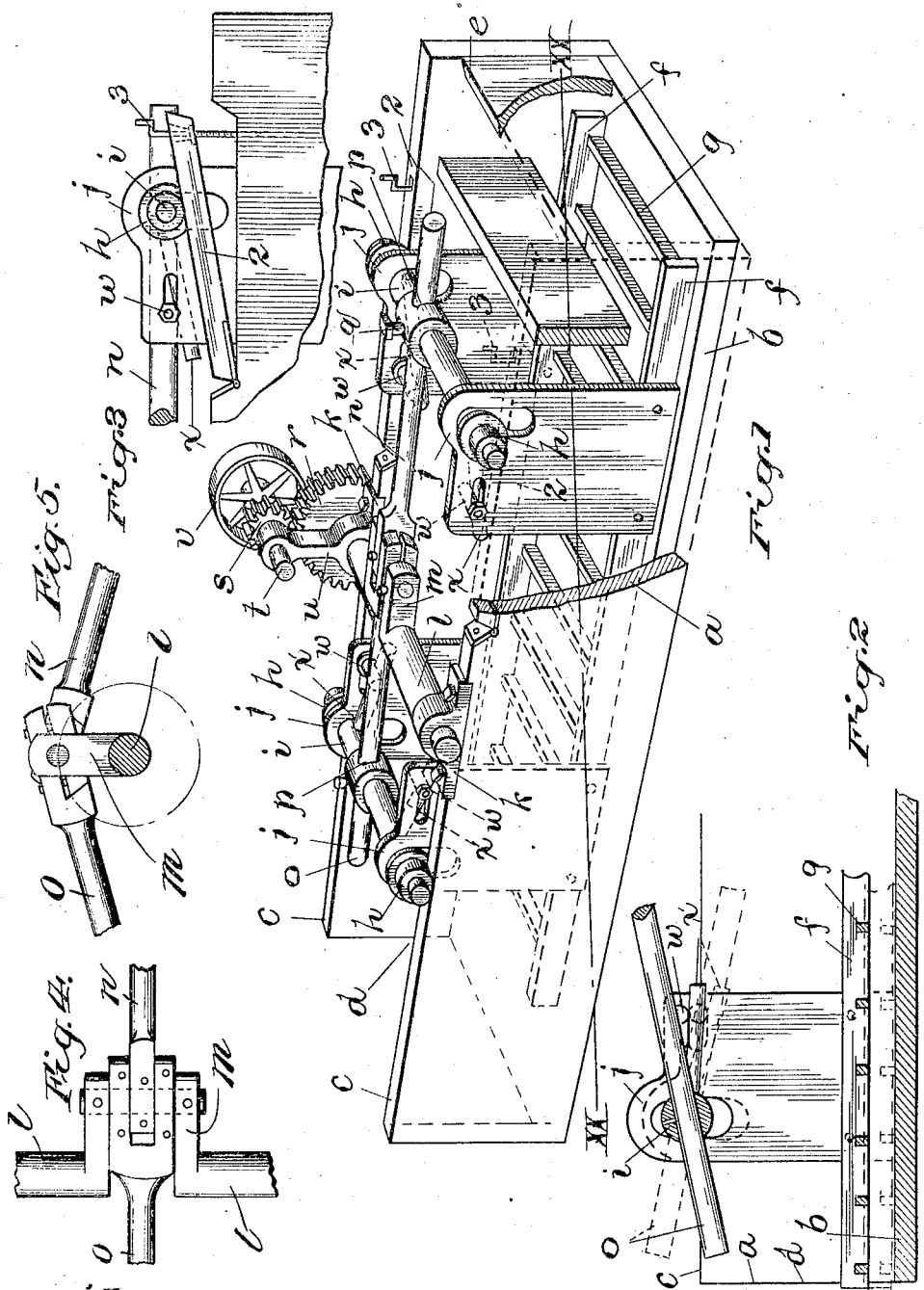
Witnesses
C. L. Gale.
A. A. Adams
Inventor
William H. Donald.
by Emil Barum
his attorney

UNITED STATES PATENT OFFICE.

WILLIAM H. DONALD, OF OAK RIDGES, ONTARIO, CANADA, ASSIGNOR OF ONE-HALF TO SAMUEL GRUNDY FORST, OF TORONTO, ONTARIO, CANADA.

CLASSIFIER.

1,330,242.  Specification of Letters Patent.  Patented Feb. 10, 1920.

Application filed April 14, 1919. Serial No. 290,003.

*To all whom it may concern:*

Be it known that I, WILLIAM HECTOR DONALD, mechanical engineer, of the town of Oak Ridges, in the county of York, Province of Ontario, Dominion of Canada, have invented certain new and useful Improvements in Classifiers, of which the following is a specification.

My invention relates to a classifier adapted to be used in the process of separating the coarse and fine sands from slimes, while passing through an inclined trough, and while being agitated by a rake suitably located therein, and adapted to be actuated in a reciprocating rectilinear motion, whereby the fine and lighter sands will be caused to overflow over the back and lower end of the trough, and the coarse and heavy sands rake over the front and high end of the trough.

This device is an improvement on my patent of the United States of America, Number 1,298,310, dated March 25th, 1919.

The device comprises an elongated trough, open at the front end, and closed across the back end. The trough is adapted to be set so that the bottom will decline from the front end toward the back end to allow the slimes and fine sands to flow over the back end of the trough, in the course of being agitated by the rake, suitably supported within the trough, and connected with means mounted on the top edges of the trough by which it is caused to be actuated in longitudinal and parallel relation with the bottom of the trough.

In the drawings—

Figure 1 is a perspective view of the device partially in section;

Fig. 2 is a detail elevational view of one end of the trough;

Fig. 3 is a detail elevational view of the opposite end of the trough.

Fig. 4, is a detail top plan view of the crank shaft and connecting rods; and Fig. 5 is a detail side elevational view of the crank shaft and connecting rods.

Like letters of reference refer to like parts throughout the specification and drawings.

$a$ designates the trough which consists of a bottom $b$, sides $c$, an open front end $d$ and a closed back end $e$.

The trough when in operation is adapted to be set so that the open front end will be higher than the back end, whereby the bottom $b$ will decline from the open end $d$, by which the slimes while passing through the trough and in the course of agitation, will be caused to flow over the back end wall or launder $e$. The approximate height of water in the trough $a$ when being operated is shown by line $xx$—$xx$ on Fig. 1.

The rake located in longitudinal relation within the trough may be of any suitable formation, but preferably formed by two side members $f$ joined together at equal distance by a series of cross bars $g$.

Carried by trolleys $h$ adapted to ride on the top edges of the sides $c$ of the trough, are rocking shafts $i$, and engaging with the rocking shafts are hangers $j$. The hangers depend from the shafts and are fastened with the side members $f$ of the rake, by which the rake is carried within the trough.

Bolted to the top edge of the sides $c$ of the trough preferably midway of the ends, are bearing-blocks $k$, and journaled therein and extending across the trough, is a crank shaft $l$.

Pivotally connected between the crank $m$ of the crank shaft $l$ are the heads of two connecting rods $n$ and $o$. The head of the connecting rod $n$ being interposed between a bifurcated head formed on the end of the connecting rod $o$, the heads of the two connecting rods being pivotally connected with the crank $m$ by the crank pin.

The heads of each of the connecting rods are split, and are held together by bolts, the object in splitting the heads, being to facilitate in engaging the rods over the crank pin, and in between the crank. The connecting rods $n$ and $o$, extending lengthwise of the trough, and adapted to engage through bores $p$ formed through the rocking shafts $i$. The rod $n$ is made fast with the rocking shaft by a fastening screw $q$, by which a rectilinear reciprocating motion may be transmitted to the rake, by the turning of the crank shaft, and the circular travel of the crank. The corresponding connecting rod $o$, engages loosely through the bore $p$, in the corresponding rocking shaft, to provide for the variance in the centers by the turning of the crank, from a horizontal to a vertical position.

Keyed on the end of the crank shaft is a gear wheel r adapted to mesh with a pinion wheel s, keyed on the end of a counter shaft t, journaled in an extension u formed integral with one of the bearing blocks k.

Keyed on the counter shaft adjacent with the pinion s, is a drive pulley v, to which a driving belt may be connected for turning the crank shaft.

Adjustably fitted in the hangers j are a series of pins w, projecting laterally toward the inside of the trough.

x designates a series of lifting levers projecting from the rocking shafts i. The lifting levers extend inwardly from each end of the rocking shafts toward the center of the trough, and are adapted to engage with the pins w when the crank has revolved into an upper vertical position, in which position the connecting rods n and o rock the shafts and cause the lifting levers to engage with the pins w, and raise the rake, so that when traveling backwardly toward the back end of the trough it will rise clear of the sands in the bottom of the trough, and in returning toward the front end it will lower and embed in the sands in the bottom of the trough, and discharge them through the open upper end.

At times when the sands may accumulate in the back end of the trough, I may find it advisable to adjust the rake at that end. For adjusting one end of the rake, I set in the tope edge of the sides c at the back end of the trough, a hinged rail 2, adapted to be adjusted to an incline with the top plane of the sides, by a hand screw 3, so that the trolleys and rocking shaft and all parts connected therewith, will ride up and down on the inclined hinged rail, so that the rake at that end will not embed so deeply into the sands.

In Fig. 3 I have shown the rail 2 adjusted into an inclined relation with the sides of the trough.

What I claim as new and desire to secure by Letters Patent is:—

1. In a classifier, the combination of a suitable trough, of a rake located in longitudinal relation in said trough, rocking shafts carried by trolleys extending in cross relation with the ends of said trough, a crank shaft journaled in and extending across the center of said trough, connecting rods pivotally connected with said crank shaft, said connecting rods engaging in actuating relation with said rocking shafts, said rake connected in suspended relation with said rocking shafts, lever arms projecting from said rocking shafts, said lever arms adapted to engage with pins, said pins projecting in lateral relation inwardly from hangers, said hangers suspending said rake from the said rocking shafts, said rocking shafts adapted to be actuated by the rotation of the said crank shaft and connection with the said connecting rods, substantially as described.

2. In a classifier, the combination of a suitable trough, said trough open at one end, a rake suspended from rocking shafts and arranged in longitudinal relation in said trough, said rocking shafts carried by trolleys adapted to ride on the top edges of said trough, a crank shaft extending across the center of said trough, connecting rods extending lengthwise of the said trough from said crank shaft, said connecting rods engaging with said rocking shafts, one of said connecting rods stationarily fixed with the rocking shaft, the corresponding connecting rod adapted to loosely engage in a bore formed through said rocking shaft, lifting levers projecting from the said rocking shafts, said levers adapted to engage with pins projecting inwardly from hangers, said hangers connecting said rake with the said rocking shafts, means for rotating said crank shaft by which the rake is actuated in a reciprocating rectilinear motion within the trough, substantially as described.

3. In a classifier, the combination of a suitable trough, a rake arranged in longitudinal relation within said trough, said rake suspended from rocking shafts, said rocking shafts carried by trolleys adapted to ride on the top edges of said trough, a crank shaft journaled in the sides of said trough, connecting rods extending between said crank shaft and said rocking shafts, one of said connecting rods fixed with the engaging rocking shafts, the corresponding connecting rod adapted to loosely engage through a bore formed in the engaging rocking shaft, lifting levers projecting from the said rocking shafts, said lifting levers adapted to engage with pins, said pins projecting inwardly from hangers, said hangers connecting the said rake in suspended relation with the said rocking shafts, means fitted on the side of said trough for rotating the said crank shaft, said crank shaft and connecting rods adapted to impart a lifting and reciprocating rectilinear motion to the said rake, substantially as described.

4. In a classifier, the combination with a trough, a rake suspended in longitudinal relation in said trough, rocking shafts extending across the said trough, said rocking shafts carried by trolleys adapted to ride on the top edges of said trough, a crank shaft journaled in the center of said trough intermediate of the rocking shafts, connecting rods extending from the said crank shaft, said connecting rods engaging with the said rocking shafts, lifting levers formed with and projecting from the said rocking shafts, said lifting levers adapted to engage with pins, said pins projecting inwardly from the sides of hangers, said hangers connecting the said rocking shafts with the said rake, said lifting levers adapted to raise and lower the said rake during the reciprocating motion imparted to the rocking shafts by the crank shaft, by which the slimes are separated by agitation, means for rotating the said crank shaft fitted on the side of the trough, substantially as described.

Signed at Toronto, this 29th day of March, 1919.

WILLIAM H. DONALD.

In the presence of—
A. A. ADAMS,
W. J. LIVINGSTON.